(12) United States Patent
Koo (10) Patent No.: US 7,237,902 B2
(45) Date of Patent: Jul. 3, 2007

(54) APPARATUS AND METHOD FOR PROJECTION TYPE DISPLAY

(75) Inventor: Hee Sool Koo, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 172 days.

(21) Appl. No.: 11/022,853

(22) Filed: Dec. 28, 2004

(65) Prior Publication Data

US 2005/0162617 A1 Jul. 28, 2005

(30) Foreign Application Priority Data

Jan. 26, 2004 (KR) ........................ 10-2004-0004656

(51) Int. Cl.
*G03B 21/14* (2006.01)
*G03B 21/26* (2006.01)
*G03B 21/00* (2006.01)

(52) U.S. Cl. ............................. 353/22; 353/30; 353/69

(58) Field of Classification Search .................. 353/69, 353/100, 30, 101, 31, 99, 22, 24
See application file for complete search history.

(56) References Cited

U.S. PATENT DOCUMENTS

| 5,250,967 | A | | 10/1993 | Miyashita | |
|---|---|---|---|---|---|
| 5,551,852 | A | * | 9/1996 | Saito et al. | 418/98 |
| 5,971,546 | A | | 10/1999 | Park | |
| 6,550,918 | B1 | * | 4/2003 | Agostinelli et al. | 353/7 |
| 6,583,819 | B2 | * | 6/2003 | Ito et al. | 348/335 |
| 6,801,238 | B2 | * | 10/2004 | Donner et al. | 347/239 |
| 7,046,407 | B2 | * | 5/2006 | Conner | 359/15 |
| 2002/0191156 | A1 | * | 12/2002 | Watanabe | 353/20 |

FOREIGN PATENT DOCUMENTS

| EP | 0 794 676 | A2 | 9/1997 |
|---|---|---|---|
| EP | 0 853 425 | A2 | 7/1998 |
| KR | 1999-38825 | A | 6/1999 |

* cited by examiner

*Primary Examiner*—Melissa Jan Koval
*Assistant Examiner*—Andrew Kong
(74) *Attorney, Agent, or Firm*—Birch, Stewart, Kolasch & Birch, LLP (57) ABSTRACT

There is provided a projection display device with an angle shifter, in which the picture quality can be improved by reducing a visual pixel gap between an imaging element and a projection lens. The projection display device includes a light source for emitting a light, an imaging element for forming an image by using the light and an input image signal, a projection lens for enlarging and projecting the image on a screen, and the angle shifter disposed between the imaging element and the screen. The angle shifter periodically changes an incident angle of the light enlarged and projected on the screen. The angle shifter includes an angle shifting plate to visually remove gaps between the pixels of the imaging element.

39 Claims, 9 Drawing Sheets

APPARATUS AND METHOD FOR PROJECTION TYPE DISPLAY

This application claims the priority benefit of the Korean Patent Application No. 10-2004-0004656 filed on Jan. 26, 2004, which is hereby incorporated by reference.

BACKGROUND OF THE INVENTION

1. Field of the Invention

The present invention relates to a projection display device, and more particularly, to a projection display device and method in which picture quality can be improved by reducing a visual pixel gap between an imaging element and a projection lens.

2. Discussion of the Related Art

As projection display devices, so-called "projectors", are widely spread, various kinds of products are developed and brought into the market. These projection display devices are developed into a type focused on brightness and a type focused on small size and light weight. This tendency to focus on the small size and light weight considers portability and reduction in the manufacturing cost.

Generally, a projection display device includes a lamp used as a light source, an illumination part for illuminating the light on an image display device, and a projection part for enlarging and projecting an image on a screen. Here, a high pressure mercury lamp is widely used as the lamp, and a liquid crystal display (LCD) and a digital micromirror device (DMD) are widely used as the image display device.

The imaging device such as the LCD used in the conventional display device includes rectangular pixels and the images are displayed by driving the pixels. However, pixel gaps between the adjacent pixels are present due to the driving of the pixels or for some other reasons. Although the pixel gaps are different depending on the display device, the pixel gaps are always present in the conventional display devices.

The pixel gaps serve as a factor that degrades the picture quality and thus reduces the resolution. Therefore, many attempts to reduce the pixel gaps have been made till now.

Among them, a simple method capable of providing clear images to viewers is to increase the number of pixels used in the display device. If the number of the pixels increases, the pixel gaps are reduced such that the clear images are provided, but the pixel gaps cannot be fundamentally removed. In addition, the increase in the number of the pixels requires additional resources for driving the respective pixels. Consequently, for driving the respective pixels, the cost of the system, the amount of calculation and the driving power also increase.

Accordingly, the method to increase the number of the pixels to improve the picture quality is not effective and is not used widely because of the above-described problems.

SUMMARY OF THE INVENTION

Accordingly, the present invention is directed to a projection display device and method that substantially obviates one or more problems due to limitations and disadvantages of the related art.

An object of the present invention is to provide a projection display device and method, capable of improving the picture quality by visually reducing the pixel gaps.

Another object of the present invention is to provide a projection display and method, capable of providing a higher resolution without increasing the number of pixels such that clear images are provided to viewers.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a projection display device including: a light source for emitting a light; an imaging element for forming an image by using the light and an input image signal; a projection lens for enlarging and projecting the image on a screen; and an angle shifter disposed between the imaging element and the screen, for periodically changing an incident angle of the image enlarged and projected on the screen.

The angle shifter may change the incident angle of the image/light projected on the screen by using at least one of reflection, refraction and scattering of light. The incident angle of the image may be changed within a distance of pixel gaps between first pixels and second pixels adjacent to the first pixel, the first pixels being pixels used for the image projected on the screen. The incident angle of the image may be periodically changed in horizontal and/or vertical directions with respect to the screen.

According to an aspect of the present invention, the angle shifter may include: an angle shifting plate for periodically changing the incident angle of the image enlarged and projected light through repetitive rotational motions; and an eccentric cam for driving the repetitive rotational motions of the angle shifting plate. The eccentric cam may include a driving motor and a motor boss decentered from a rotational center of the driving motor and to which the angle shifting plate is attached.

According to the present invention, the angle shifter may include: an angle shifting plate tilted by a predetermined angle and repetitively rotated by an eccentric cam, such that an incident angle of light is periodically changed; a dummy holder connected to the angle shifting plate, for driving the angle shifting plate; a rotation reference boss provided at end portions of upper and lower surfaces of the dummy holder; a reference holder having a rotation reference hole into which the rotation reference boss is inserted; and an elliptical insertion hole formed long in a vertical direction at one side of the dummy holder, the elliptical insertion hole being connected to a motor boss.

The angle shifting plate may repetitively rotate between a position vertical to a traveling direction of light and a position tilted by a predetermined angle at which the pixel is visually movable by a gap between the pixels.

According to another aspect of the present invention, there is provided a projection display device including: a lamp used as a light source; an illuminating system for separating/modulating/condensing a light emitted from the lamp; an LCD panel for determining transmittances of the condensed light depending on pixels; a dichroic prism for displaying an image by combining R, G and B lights incident to the LCD panel; a projection lens for enlarging and projecting the image that is combined and displayed by the dichroic prism; and an angle shifter disposed between the LCD panel and a screen, the angle shifter being driven to periodically change an incident angle of light enlarged and projected on the screen, such that pixel gaps according to the enlarged and projected image are visually reduced.

The angle shifter may be disposed between the screen and the projection lens, or between the dichroic prism and the projection lens, or between the LCD panel and the dichroic prism. The angle shifter may use at least one of reflection, refraction and scattering of light.

According to a further another aspect of the present invention, there is provided a projection display device including: a lamp used as a light source; an illuminating system for separating/modulating/condensing a light emitted from the lamp; a TIR prism for imaging the condensed light with an appropriate size and providing an uniform light distribution on a display surface of a DMD, which is an image display device disposed at a next stage; a projection lens for enlarging and projecting the displayed image of the DMD on a screen; and an angle shifter disposed between the DMD and the screen, the angle shifter being driven to periodically change an incident angle of light enlarged and projected on the screen, such that pixel gaps according to the enlarged and projected image are visually reduced.

The angle shifter may be disposed between the screen and the projection lens, or between the TIR prism and the projection lens, or between the DMD and the TIR prism.

According to a still further another aspect of the present invention, there is provided a projection display method including the steps of: forming an image by using a light emitted from a light source and an inputted image signal; periodically changing a traveling direction of the image within a pixel gap of an imaging element during one frame; and enlarging and projecting the image whose traveling direction is periodically changed on a screen.

The traveling direction of the image may be periodically changed by at least one of reflection, refraction and scattering of light. The traveling direction of the image may be periodically changed in at least one direction among up, down, right and left directions.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. All the components of the invention are operatively coupled.

A projection display device includes a lamp, an illumination part and a projection part and can be classified depending on an image display device used in the illumination part. In the projection display device, an LCD or a DMD can be used as the image display device.

Although there are various types of the projection display device, the preferred embodiments of the present invention will be described with the above-mentioned two types (LCD or DMD) of the projection display device. However, the present invention is not limited to them but can be applied to all types of projection display device.

Figure 1:
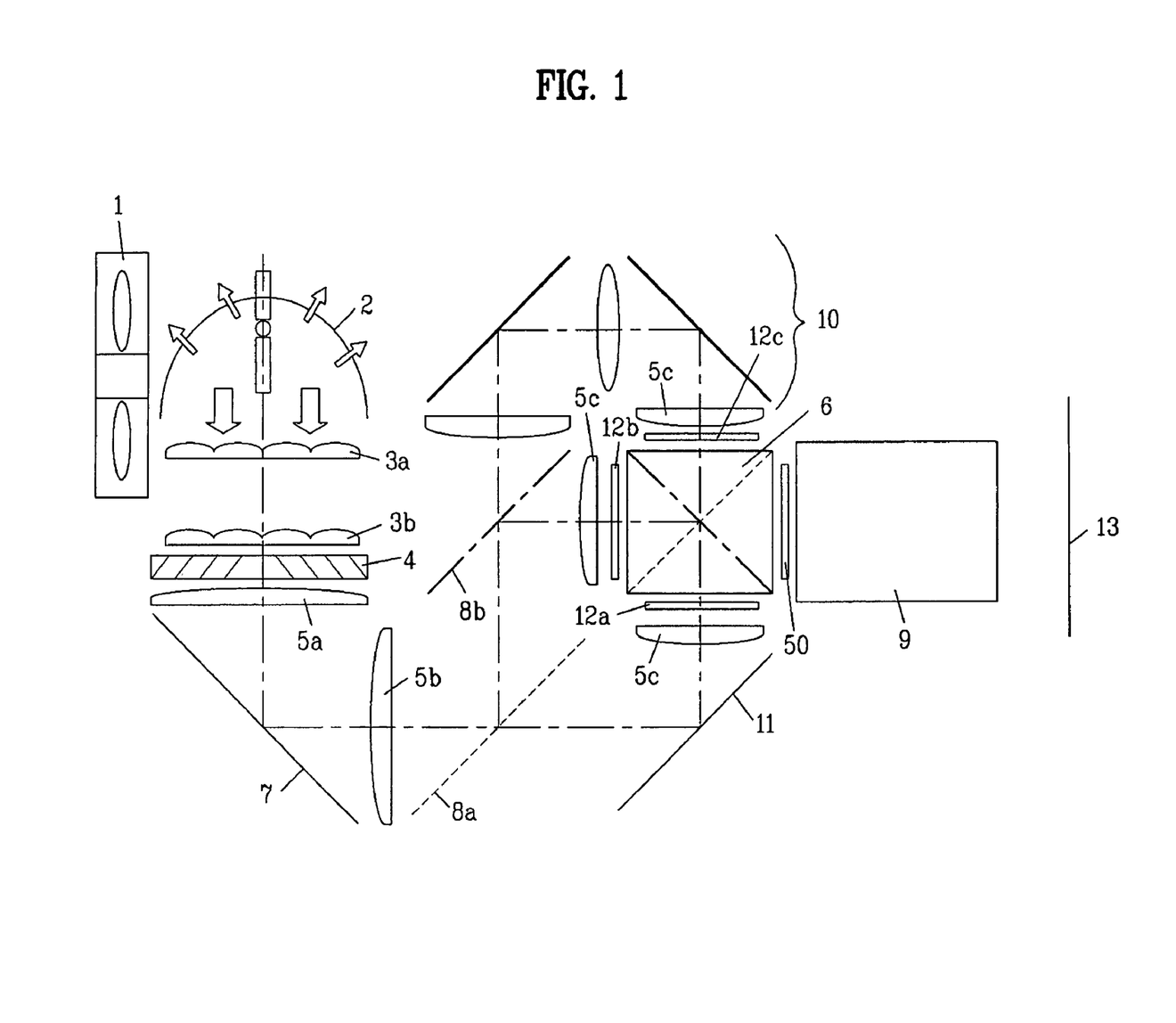
FIG. 1 illustrates a construction of a projection display device using an LCD according to an embodiment of the present invention.
Figure 2A:
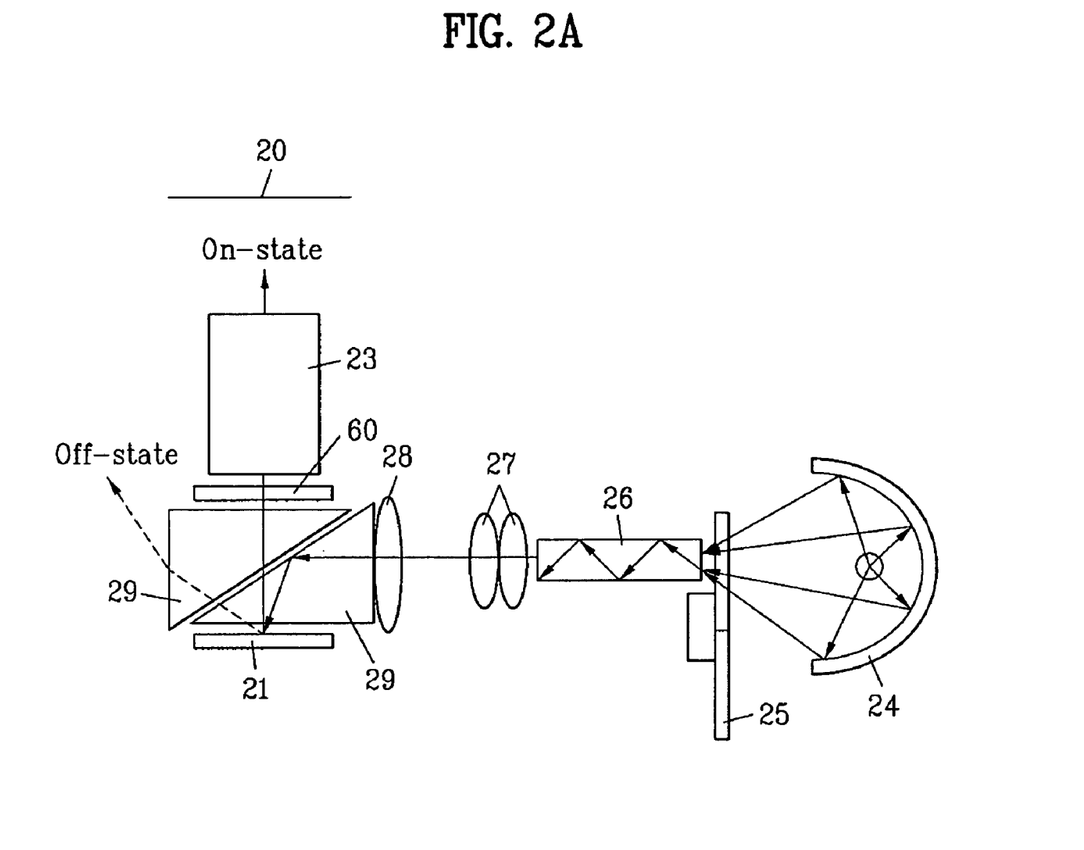
FIGS. 2A and 2B illustrate a construction of a projection display device using a DMDA according to an embodiment of the present invention.
Figure 2B:
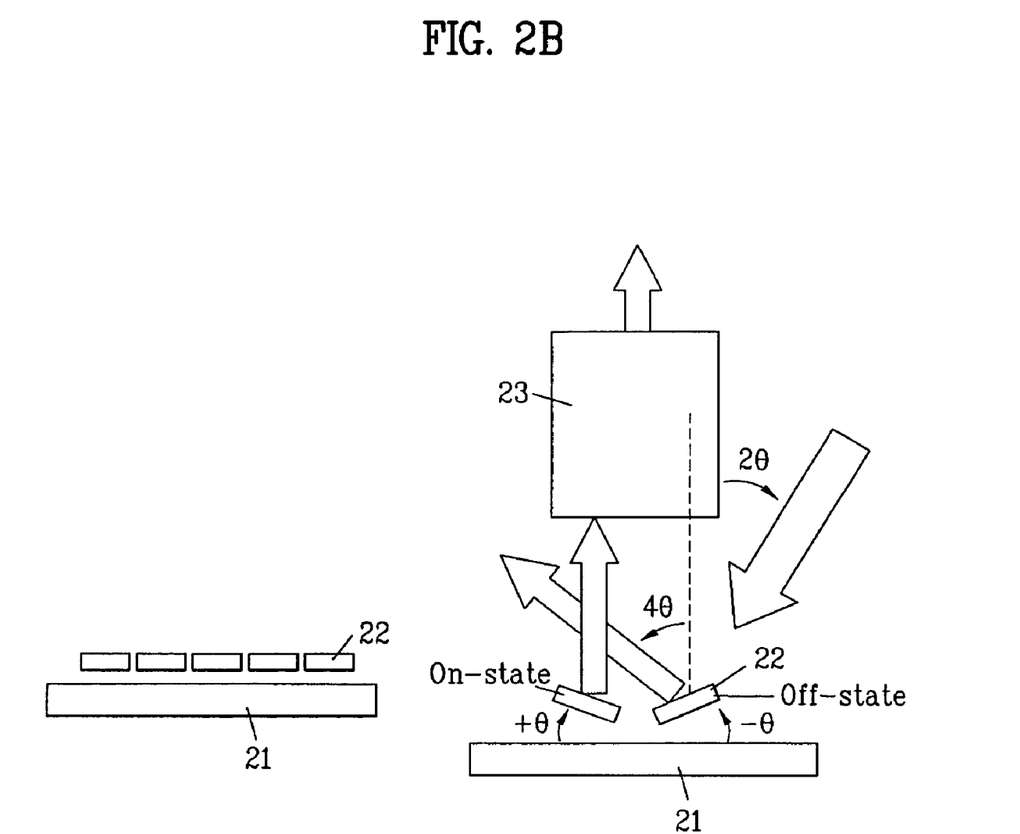

FIG. 1 illustrates a construction of a projection display device using an LCD and FIGS. 2A and 2B illustrate a construction of a projection display device using a DMD, all according to the present invention.

First, a projection display device using an LCD will now be described with reference to FIG. 1.

As shown in FIG. 1, in the projection display device using the LCD as the image display device, a lamp fan 1 cools a lamp 2 having a reflector. Light emitted from the lamp 2 passes through first and second fly eye lenses (FELs) 3a and 3b, a polarizing beam splitter 4 and a first condensing lens 5a. Then, a total-reflection mirror 7 changes a traveling direction of the light from the condensing lens 5a by 90°.

The light reflected from the total-reflection mirror 7 passes through a second condensing lens 5b and is incident to a first dichroic mirror 8a. The dichroic mirror 8a transmits a red (R) light and reflects a green (G) light and a blue (B) light. The transmitted red light is reflected by a reflector 11.

The reflected green and blue lights are incident on a second dichroic mirror 8b. The second dichroic mirror 8b reflects the green light and transmits the blue light. The blue light transmitted through the second dichroic mirror 8b passes through a relay lens system 10 (e.g., reflectors, condensing lenses, etc.).

The R, G and B lights are condensed by third condensing lenses 5c disposed respectively in front of R, G and B LCD panels 12a, 12b and 12c. Then, the lights are incident on the R, G and B LCD panels and combined by a dichroic prism 6. Finally, the lights from the prism 6 are then incident on a projection lens 9 that enlarges and projects the image on a screen 13.

According to the present invention, an angle shifter is disposed somewhere between the LCD panels and the screen. The angle shifter is driven to periodically change an incident angle of the light projected on the screen so as to reduce the visual pixel gaps depending on the image. The angle shifter may be disposed between the screen and the projection lens 9, or between the dichroic prism 6 and the projection lens 9, or between the LCD panel and the dichroic prism 6. For the sake of convenience and as an example only, the angle shifter 50 disposed between the dichroic prism 6 and the projection lens 9 is shown and will be described later in reference to FIGS. 3A and 3B.

In this regard, a dummy glass will be used as the angle shifter. The dummy glass is a light transmitting element that periodically changes the incident angle of the light incident on the projection lens by using the refractive index of light. But, the angle shifter is not limited to the dummy glass and may use a reflection, refraction or scattering of light to change the incident angle of the light. In addition, a mirror, a refractive material or a scattering unit may be used. That is, any means that can periodically change the incident angle of light incident on the projection lens 9 (or other element depending on the location of the angle shifter) can be used.

A projection display device using a DMD will now be described with reference to FIGS. 2A and 2B.

As shown in FIG. 2A, a lamp 24 having an elliptical reflector attached thereto is used as a light source to condense a light on an incident plane of a rod lens 26. A color wheel 25 is disposed between the lamp 24 and the rod lens 26 to sequentially separate color into red, green and blue (R, G and B). Here, as R, G and B filters are attached to a rotating motor in a disc shape and are rotated, the color wheel 25 sequentially filters the colors.

A portion where an area of the color filtering region is minimized is a portion where the light emitted from the lamp 24 is condensed on the incident plane of the rod lens 26. For this reason, the color wheel 25 is disposed on a path before the incident plane of the rod lens 26.

If the lights filtered into specific colors by the color wheel 25 are incident on the rod lens 26, the lights are reflected several times and are transmitted through the rod lens 26. Then, the lights are uniformly radiated from an entire surface of an output plane of the rod lens 26. That is, the light emitted from the light source passes through the output plane of the rod lens 26, such that the output plane serves as a surface light source having a second uniform brightness distribution.

The lights emitted from the rod lens 26 pass through first and second illuminating lenses 27 and 28 and a TIR prism 29. As a result, the output plane of the rod lens 26 is imaged with appropriate size on a DMD 21, which acts as the image display device. In this manner, the light distribution is uniformly provided on the display plane of the DMD 21.

Then, the images displayed on the DMD 21 are incident on a projection lens 23, which enlarges and projects the images on a screen 20.

As shown in FIG. 2B, the DMD 21 is configured with a plurality of micromirrors 22 provided at its upper portion. Each of the micromirrors 22 is a pixel that is a minimum display unit, and has ±θ tilt modes depending on electrical signals. That is, by applying a certain electrical signal, each micromirror 22 can be selectively tited and the tilt amount (θ) can be set by varying the electrical signal. In this regard, θ of 10° or 12° can be used.

In addition, in the structure that uses the DMD 21 to enlarge and project images on the screen through the projection lens 23, the image forming condition is that the plane of the DMD 21 and the optical axis of the projection lens 23 must be vertically disposed. At this point, the center of the DMD 21 and the optical axis of the projection lens 23 coincide with each other in a horizontal direction of the DMD 21 and an upward projection is applied to decenter them in a vertical direction for the convenient use.

Such a projection optical system has an on-state (white) when the illuminated light is reflected by the micromirrors 22 and then vertically incident on the projection lens 23.

An angle between the illuminated light in a direction of the main axis and the central axis of the projection lens 23 is 2θ, and an angle between the micromirror 22 and the plane of the DMD 21 is +θ.

In this condition, if the angle between the micromirror 22 and the plane of the DMD 21 is −θ (FIG. 2A), the light in the direction of the main axis is reflected from the central axis of the projection lens 23 at 4θ. At this point, since the illuminated light is not directed to the projection lens 23, it becomes an off state (black).

In addition, according to the present invention, an angle shifter is disposed somewhere between the DMD 21 and the screen. The angle shifter is driven to periodically change an incident angle of the light enlarged and projected on the screen so as to reduce the visual pixel gaps depending on the images.

The angle shifter may be disposed between the screen 20 and the projection lens 23, or between the TIR prism 29 and the projection lens 23, or between the DMD 21 and the TIR prism 29. For the sake of convenience and as an example only, the angle shifter 60 disposed between the TIR prism 29 and the projection lens 23 is shown and will be described later in reference to FIGS. 3A and 3B.

In this regard, a dummy glass will be used as the angle shifter. The dummy glass is a light transmitting element that periodically changes the incident angle of the light incident on the projection lens 23 by using the refractive index of light. Here, the angle shifter is not limited to the dummy glass and may use a reflection, refraction or scattering of light. In addition, a mirror, a refractive material or a scattering unit may be used. That is, any means that can periodically change the incident angle of light incident on the projection lens 23 (or other element depending on the location of the angle shifter) can be used.

In the device of FIGS. 1–2B, a signal processor supplies appropriate image signals to the LCD panels and the DMD of the device.

Figure 3A:
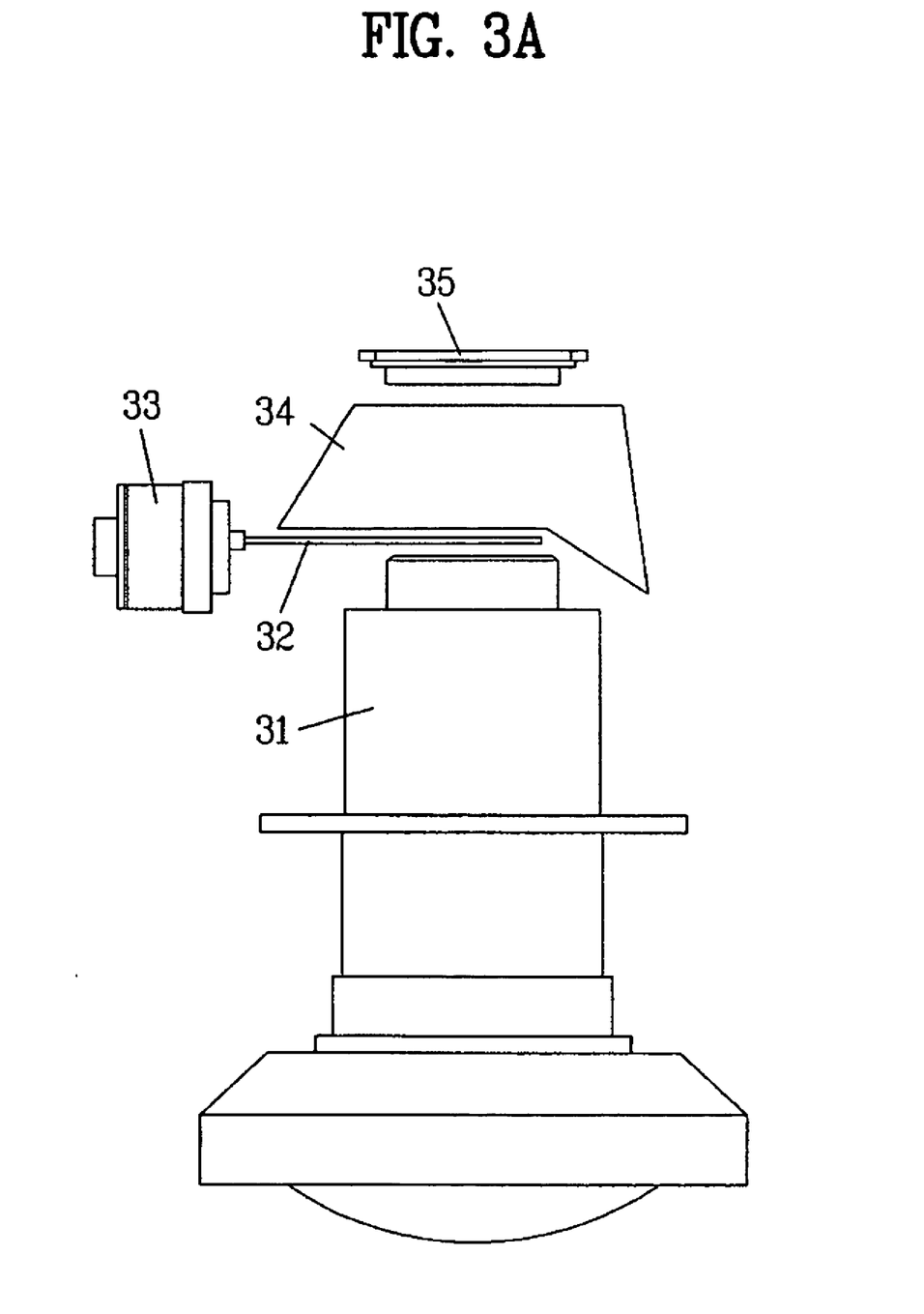
FIG. 3A illustrates a construction of a projection display device when a dummy glass (angle shifter) is in a horizontal position according to the present invention.
Figure 3B:
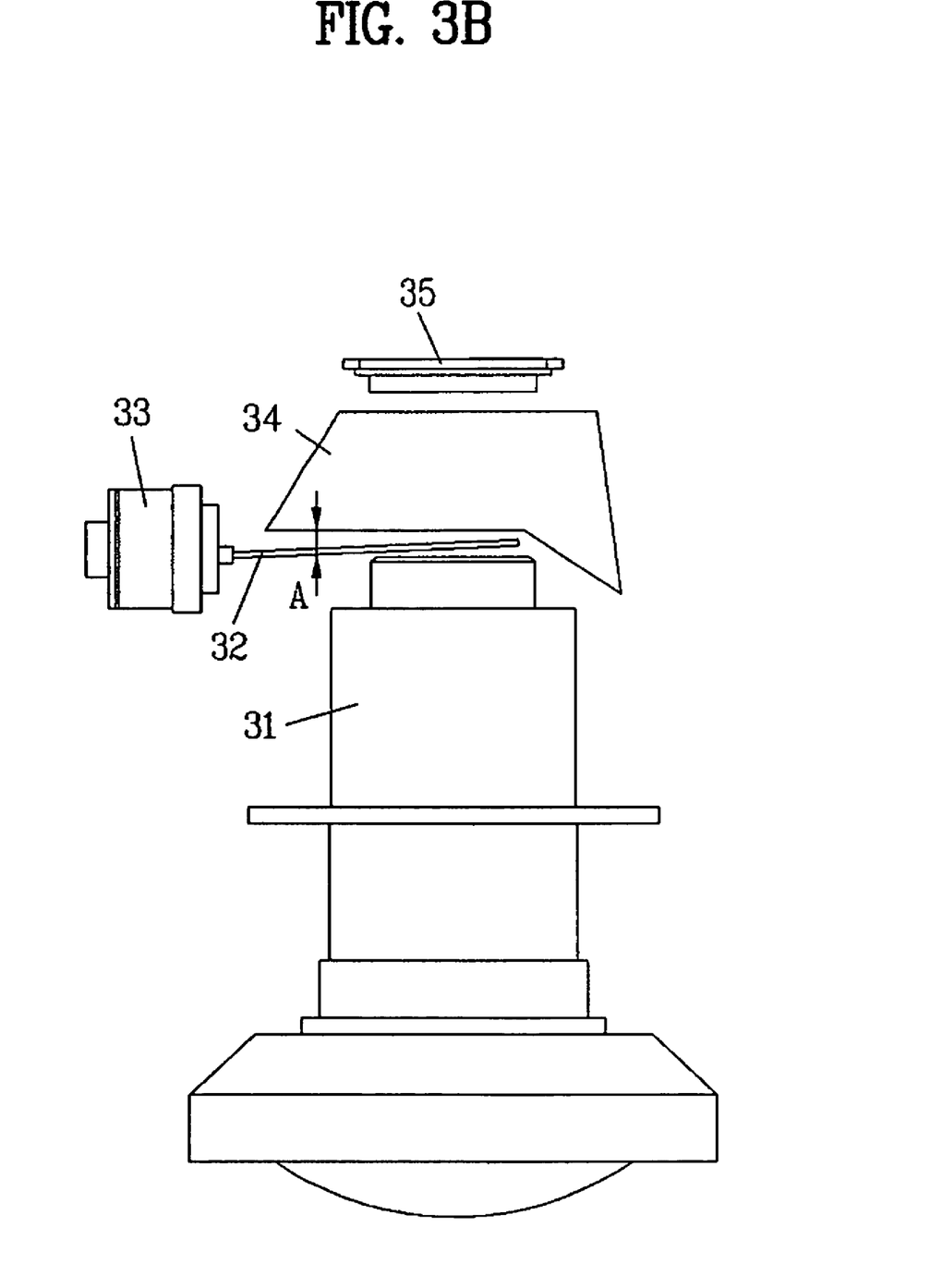
FIG. 3B illustrates a construction of the projection display device of FIG. 3A when the dummy glass is driven and tilted by an eccentric cam according to the present invention.

FIGS. 3A and 3B illustrate a simplified view of a projection display device using the dummy glass as the angle shifter according to the present invention. In more detail, FIG. 3A illustrates a construction of the projection display device when the dummy glass is in a horizontal position, and FIG. 3B illustrates a construction of the projection display device of FIG. 3A when the dummy glass is tilted by an eccentric cam.

Referring to FIGS. 3A and 3B, an imaging element 35 receives light illuminated through an illuminating optical system and displays an image. A prism 34 emits an image signal of the imaging element 35. A projection lens 31 enlarges and projects the signal vertically incident through the prism 34 on a screen. An angle shifter is provided with a dummy glass 32 in the form of a plate and is controlled by a motor 33. The dummy glass 32 acting as a light transmitting element is disposed between the imaging element 35 and the projection lens 34, and the motor 33 drives the dummy glass 32.

The imaging element 35 may be an LCD or a DMD such as the ones shown in FIGS. 1 and 2A. In this case, the prism 34 in FIG. 3A can be the prism 6 or 29 in FIGS. 1 and 2A; the projection lens 31 can be the projection lens 9 or 23 in FIGS. 1 and 2A; and the angle shifter (32) can be the angle shifter 50 or 60 in FIGS. 1 and 2A. Although not shown, the projection display device of FIGS. 3A and 3B includes all other known components of the conventional display device.

Figure 7:
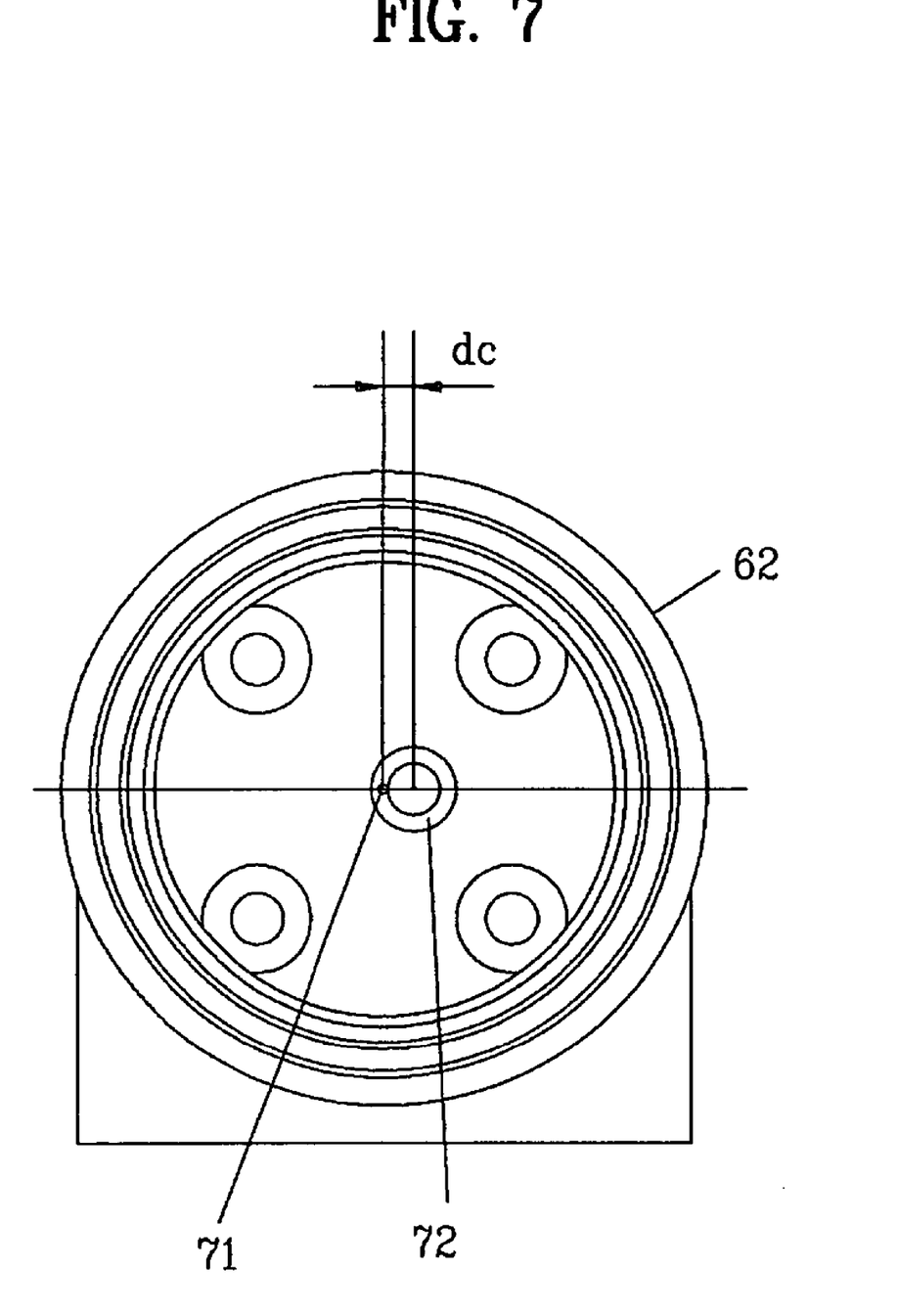
FIG. 7 illustrates a construction of a motor used to drive the dummy glass according to the present invention.

As shown in FIG. 7, the dummy glass 32 is driven by an eccentric cam (33) to visually remove the pixel gaps. The eccentric cam is a motor configured with a motor boss 72, which is decentered from a rotational center 71. Its principle will now be described according to the present invention.

Figure 4A:
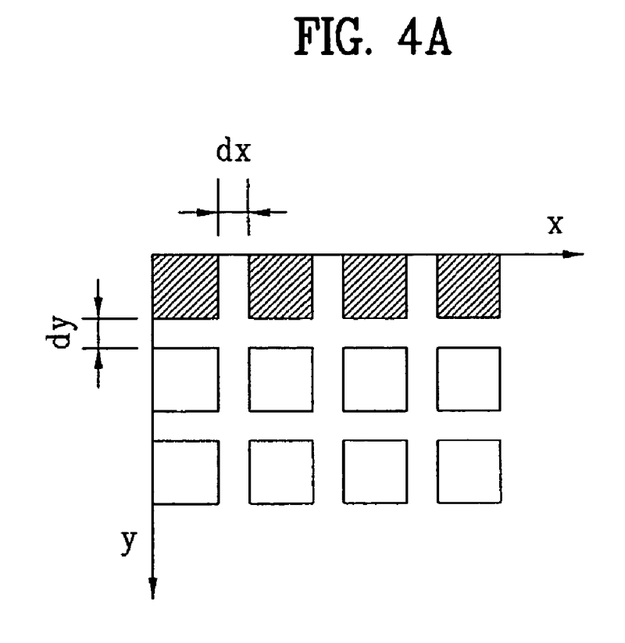
FIGS. 4A to 4C illustrate pixel states recognized by viewers when the dummy glass is driven according to the present invention.
Figure 4B:
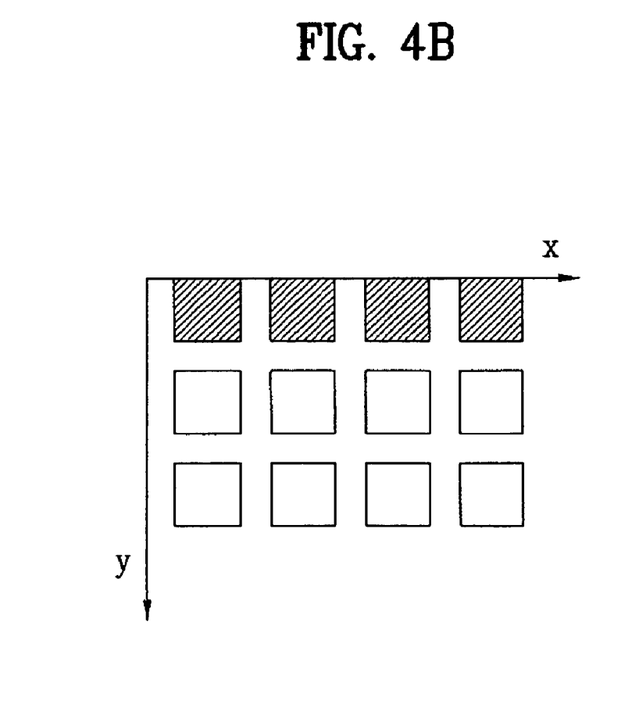

When the dummy glass 32 is in a horizontal position as shown in FIG. 3A, there exist pixel gaps dx and dy as shown in FIG. 4A. Meanwhile, when the dummy glass 32 is tilted by the eccentric cam as shown in FIG. 3B, the pixels are shifted in at least one direction by a predetermined distance as shown in FIG. 4B. At this point, it is preferable that the shifted distance of the pixels be equal to or less than the distances dx and dy between the adjacent pixels, to avoid overlapping of the pixels to each other. If the adjacent pixels are shifted and overlapped, the picture quality may be degraded due to the interference between the pixels, although the resolution is improved when the pixel gaps are reduced.

Accordingly, in order to prevent the degradation of the picture quality when the pixel gaps of the projection system are reduced, the dummy glass 32 is disposed between the imaging element 35 and the projection lens 31, and is periodically shifted to move the pixels. Therefore, according to the present invention the pixel gaps can be visually removed by periodically shifting the pixels within the range without interference from the adjacent pixels.

The operation of the dummy glass 32 (angle shifter) is now explained in more detail.

Figure 5:
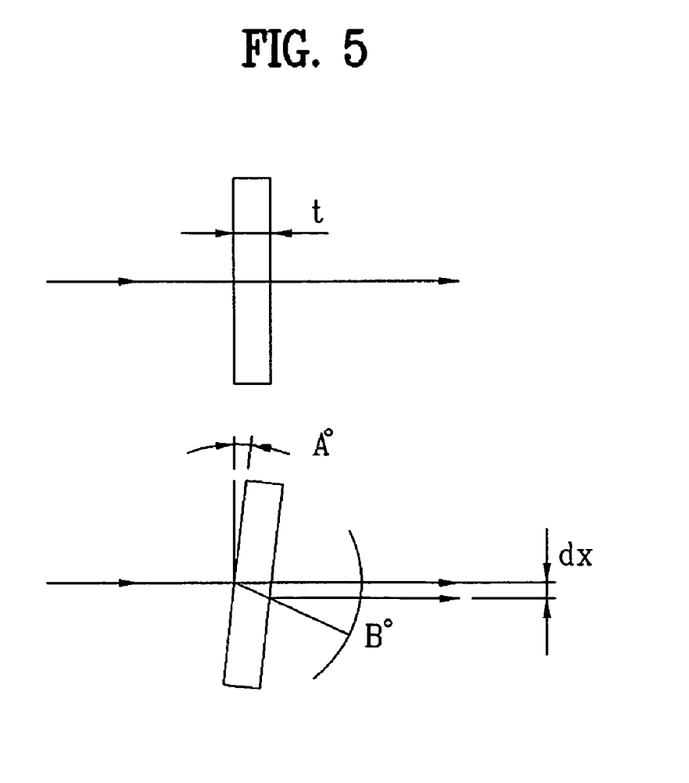
FIG. 5 illustrates shift distances (dx) of pixels depending on the refractive index of the dummy glass according to the present invention.

The dummy glass 32 is periodically tilted and untilted by the angle "A", which is calculated in order to shift the pixels by the distance of, e.g., dx, as shown in FIG. 5. At this point, the angle "A" that is calculated using the thickness, tilt angle (incident angle of light) and refractive index of the angle shifter (in this example, the dummy glass 32), and the shift degree (B°) of the incident angle on the screen is determined from the angle "A".

It should be rotated that the dummy glass 32 (or the angle shifter) is differently tilted depending on the position of the angle shifter. FIG. 5 illustrates the shift distance (dx) of the pixels depending on the refractive index of the dummy glass 32.

If the dummy glass 32 repeats the states of FIGS. 3A and 3B during one frame period at a very fast speed, a viewer cannot distinguish the images being displayed. Consequently, the viewer recognizes the image just like the state of FIG. 4C. That is, due to the repeated rotation motion of the dummy glass 32 disposed between the imaging element and the projection lens, the projection display device according to the present invention can prevent the degradation of the picture quality, which is caused by the pixel gaps, and can also improve the resolution.

Although the repeated rotation motion of the dummy glass 32 is driven by the motor, the present invention is not limited to using only the motor and can use any driving apparatus that allows the dummy glass 32 (or other angle shifter member) to be shifted repetitively and fast during one frame or any set time duration.

An embodiment of the present invention using the motor to drive the dummy glass will now be described referring to FIGS. 6 and 7.

Figure 6:
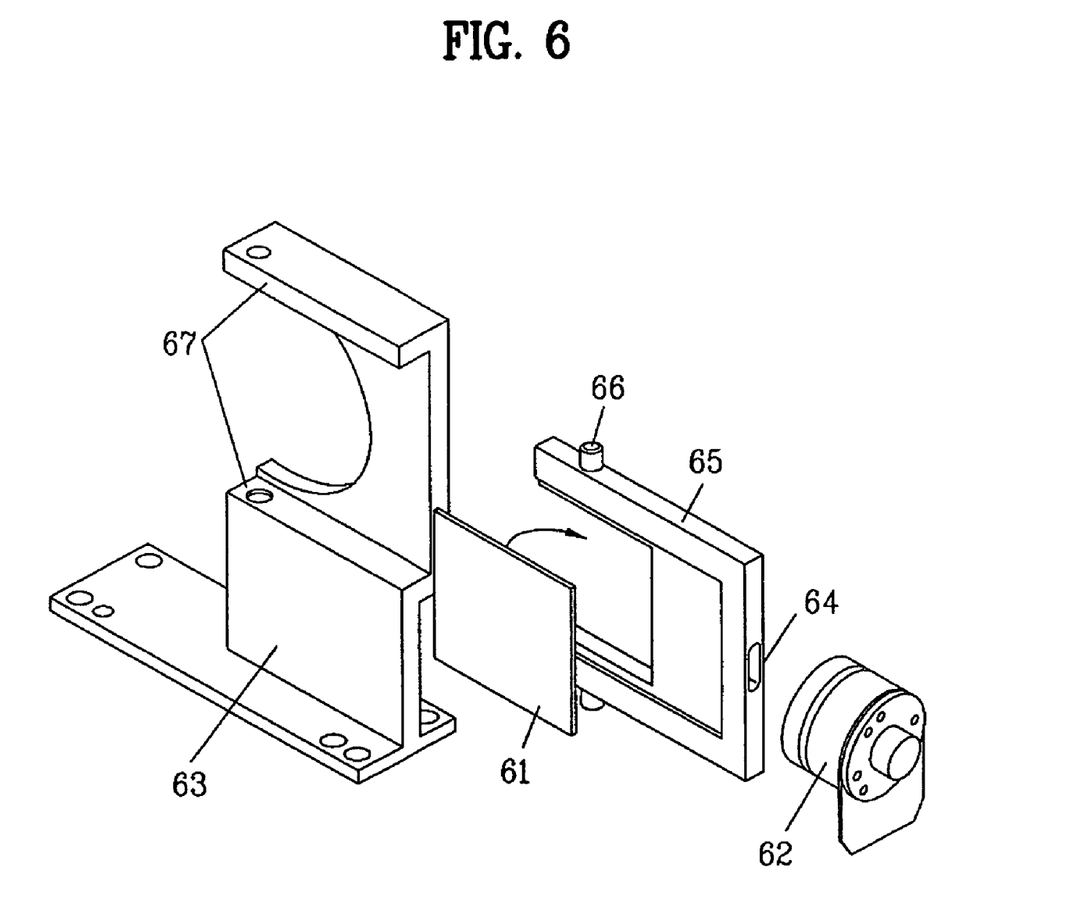
FIG. 6 illustrates a construction of a dummy glass driving part according to an embodiment of the present invention.

FIG. 6 illustrates a construction of a dummy glass driving part according to the present invention, and FIG. 7 illustrates a construction of a motor used to drive a dummy glass according to the present invention. The motor of FIG. 7 can be used with the dummy glass driving part of FIG. 6, which can be used to drive/move the dummy glass 32 of FIGS. 3A and 3B.

As shown in FIG. 6, a dummy glass 61 (e.g., dummy glass 32 in FIG. 3A) is fitted into a dummy holder 65, and rotational reference bosses 66 formed at upper and lower end portions of the dummy holder 65 are inserted into rotational reference holes 67 formed at the corresponding positions of a reference holder 63. An elliptical insertion hole 64 is formed and extends in a vertical direction at one side of the dummy holder 65.

As shown in FIG. 7, the eccentric cam (e.g., 33 in FIG. 3A) includes a motor 62 and a motor boss 72, which is decentered from a rotational center 71 of the motor. Since the motor boss 72 is decentered or off-centered from the rotational center 71 of the motor, the eccentric cam rotates by "dc".

If the motor 62 is driven in a state that its motor boss 72 is inserted into the elliptical insertion hole 64 of the dummy holder 65, the motor boss 72 can move in a vertical direction of the elliptical insertion hole 64. Thus, the rotation of the motor boss 72 does not influence the shift of the dummy holder 65. However, since there is no degree of freedom in a horizontal direction, the dummy holder 65 is pushed by the motor boss 72. Therefore, the dummy holder 65 is pivoted by the reference boss 66 and rotates around the rotational reference boss 66 and reciprocates as much as the angle of "A".

Figure 4C:
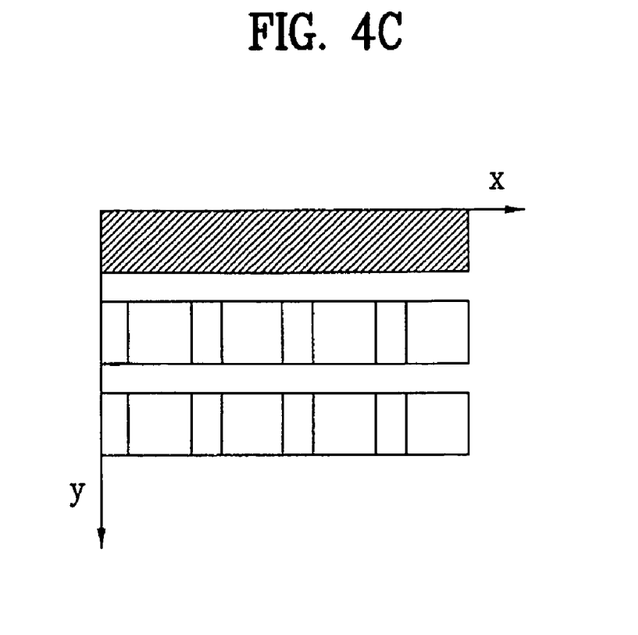

Thus, if the motor is driven in such a state that it is connected to the elliptical insertion hole 64, the decentered motor boss 72 rotates the dummy holder 65 in a horizontal direction with respect to the reference holder 63 so as to tilt/untilt the dummy glass 61 periodically, which in turn provides the needed pixel shift effect of FIG. 4C.

Due to the construction of the dummy glass driving part as shown in FIG. 6, the pixels are moved such that the viewer actually recognizes the images just as shown in FIG. 4C.

Although the dummy glass driving part of FIG. 6 is driven in a horizontal direction with respect to the reference holder 63, it can also be driven in a vertical direction. That, it is apparent that the dummy glass driving part can be differently constructed depending on the characteristics of the image display device and be driven in any direction as desired to provide the pixel shifting feature. For instance, the shift of the pixels can remove the pixel gaps in x direction and can also remove the pixel gaps in y direction depending on the directionality of the repetitive rotation of the dummy glass. Further, the pixel gaps between pixels disposed in a diagonal direction as well as x and y directions can also be removed.

Methods for changing the tilt direction of the dummy glass 61 will now be described according to the present invention.

There are two methods that can change the dummy glass 61 to have various slopes through the driving of the motor by using only one dummy glass 61.

The first method is to form the insertion hole 64 in a shape to further have a spare space in the horizontal direction, so that the motor boss 72 can move in the horizontal direction as well as the vertical direction shown in FIG. 6. Therefore, the slope of the dummy glass 61 can be changed to have the horizontal and/or vertical directionality with respect to the reference holder 63. At this point, it is preferable that the insertion hole 64 is formed in a smoothly curved shape because the motor boss 72 is continuously moved due to the rotation of the motor.

The second method is to form at least two insertion holes 64, which are not in parallel with the dummy holder 65. The rotational center 71 of the motor and the decentered motor boss 72 are inserted into the insertion holes 64. Then, the motors are driven corresponding to the change in the slopes of the dummy glass 61. Thus, the slope of the dummy glass 61 can be changed to have one or more directionalities. In this case, the shapes of the insertion holes 64 are differently formed so that the dummy glass 61 can have movements of different slopes/directions when the corresponding motors are driven. In addition, the insertion holes 64 may be formed in a shape to make the dummy glass 61 have perpendicular slopes to each other.

Further, another method is to provide at least two dummy glasses and at least two motors. In this case, the dummy glasses are independently driven to have movements of different slopes/directions, and the refractive indexes of light refracted through the two dummy glasses are calculated. In this manner, the resolution can be improved by reducing the pixel gap between the pixel displaying an image on the screen and its adjacent pixel.

It will be apparent to those skilled in the art that various modifications and variations can be made in the present invention. Thus, it is intended that the present invention covers the modifications and variations of this invention provided they come within the scope of the appended claims and their equivalents.

The present invention has at least the following advantages.

According to the projection display device and method of the present invention, the pixel gaps dx and dy can be visually removed by driving the dummy glass inserted between the imaging element and the projection lens.

Furthermore, the present invention can provide a higher resolution by inserting only the dummy glass without increasing the number of the pixels. Thus, clear images can be provided to the viewers, thereby improving the reliability and quality of the products.

What is claimed is:

1. A projection display device comprising:
   a light source for emitting a light;
   an imaging element for forming an image by using the light and an input image signal;
   a projection lens for enlarging and projecting the image on a screen; and
   an angle shifter disposed between the imaging element and the screen, for periodically changing an incident angle of the image projected on the screen,
   wherein the angle shifter includes an angle shifting plate for periodically changing the incident angle of the image projected through repetitive rotational motions and an eccentric cam for driving the repetitive rotational motions of the angle shifting plate.

2. The projection display device of claim 1, wherein the angle shifting plate is made of a light transmitting material.

3. The projection display device of claim 1, wherein the eccentric cam includes:
   a driving motor; and
   a motor boss decentered from a rotational center of the driving motor and to which the angle shifting plate is attached.

4. The projection display device of claim 1, wherein the angle shifter changes the incident angle of the image projected on the screen by using at least one of reflection, refraction and scattering of light.

5. The projection display device of claim 1, wherein the incident angle of the image is changed within a distance of pixel gaps between first pixels and second pixels adjacent to the first pixel, the first pixels being pixels used for the image projected on the screen.

6. The projection display device of claim 1, wherein the incident angle of the image is periodically changed in horizontal and/or vertical directions with respect to the screen.

7. The projection display device of claim 1, wherein the angle shifter further comprises:
   a dummy holder connected to the angle shifting plate, for driving the angle shifting plate;
   a rotation reference boss provided at end portions of upper and lower surfaces of the dummy holder;
   a reference holder having a rotation reference hole into which the rotation reference boss is inserted; and
   an elliptical insertion hole formed at one side of the dummy holder.

8. The projection display device of claim 7, wherein the angle shifting plate repetitively rotates between a position vertical to a traveling direction of light and a position tilted by a predetermined angle at which a pixel is visually movable by a gap between pixels.

9. The projection display device of claim 7, wherein the eccentric cam includes a motor having a motor boss decentered from a rotational center so as to drive the angle shifting plate, the motor boss being inserted into the elliptical insertion hole.

10. The projection display device of claim 9, wherein the decentered degree of the motor boss is proportional to a shifted distance of the angle shifting plate.

11. A projection display device comprising:
    a light source for emitting a light;
    an imaging element for forming an image by using the light and an input image signal;
    a projection lens for enlarging and projecting the image on a screen; and
    an angle shifter disposed between the imaging element and the screen, for periodically changing an incident angle of the image projected on the screen,
    wherein the angle shifter includes:
       an angle shifting plate; and
       a housing for holding the angle shifting plate, and having at least one hole for receiving at least one engaging member to selectively and repetitively tilt the angle shifting plate.

12. A projection display device comprising:
    a light source;
    an illuminating system for separating/modulating/condensing a light emitted from the light source;
    at least one LCD panel for determining transmittances of the condensed light depending on pixels;
    a prism for displaying an image by combining R, G and B lights incident on the LCD panel;
    a projection lens for enlarging and projecting the image that is combined and displayed by the prism; and
    an angle shifter disposed between the LCD panel and a screen, the angle shifter being driven to periodically change an incident angle of the image projected on the screen, such that pixel gaps according to the enlarged and projected image are visually reduced,
    wherein the angle shifter includes an angle shifting plate tilted by a predetermined angle and repetitively rotated by an eccentric cam, such that an incident angle of light is periodically changed.

13. The projection display device of claim 12, wherein the angle shifter is disposed between the screen and the projection lens.

14. The projection display device of claim 12, wherein the angle shifter is disposed between the prism and the projection lens.

15. The projection display device of claim 12, wherein the angle shifter is disposed between the LCD panel and the prism.

16. The projection display device of claim 12, wherein the angle shifter uses at least one of reflection, refraction and scattering of light.

17. The projection display device of claim 12, wherein the incident angle of the image is changed within a distance of pixel gaps between first pixels and second pixels adjacent to the first pixels, the first pixels being pixels used for the image projected on the screen.

18. The projection display device of claim 12, wherein the incident angle of the image is periodically changed in horizontal and/or vertical directions with respect to the screen.

19. The projection display device of claim 12, wherein the angle shifter further comprises:
 a dummy holder connected to the angle shifting plate, for driving the angle shifting plate;
 a rotation reference boss provided at end portions of upper and lower surfaces of the dummy holder;
 a reference holder having a rotation reference hole into which the rotation reference boss is inserted; and
 an elliptical insertion hole formed at one side of the dummy holder, the elliptical insertion hole being connected to a motor boss.

20. The projection display device of claim 19, wherein the angle shifting plate is made of a light transmitting material.

21. The projection display device of claim 19, wherein the angle shifting plate repetitively rotates between a position vertical to a traveling direction of light and a position tilted by a predetermined angle at which the pixel is visually movable by a gap between the pixels.

22. The projection display device of claim 19, wherein the eccentric cam includes a motor having the motor boss decentered from a rotational center so as to drive the angle shifting plate.

23. The projection display device of claim 22, wherein the decentered degree of the motor boss is proportional to a shifted distance of the angle shifting plate.

24. A projection display device comprising:
 a light source;
 an illuminating system for separating/modulating/condensing a light emitted from the light source;
 a prism for imaging the condensed light with an appropriate size and providing a uniform light distribution on a display surface of a DMD;
 the DMD providing an image to be displayed based on the received light and an input image signal;
 a projection lens for enlarging and projecting the image from the DMD on a screen; and
 an angle shifter disposed between the DMD and the screen, the angle shifter being driven to periodically change an incident angle of the image projected on the screen, such that pixel gaps according to the enlarged and projected image are visually reduced,
 wherein the angle shifter includes an angle shifting plate tilted by a predetermined angle and repetitively rotated by an eccentric cam, such that an incident angle of light is periodically changed.

25. The projection display device of claim 24, wherein the angle shifter is disposed between the screen and the projection lens.

26. The projection display device of claim 24, wherein the angle shifter is disposed between the prism and the projection lens.

27. The projection display device of claim 24, wherein the angle shifter is disposed between the DMD and the prism.

28. The projection display device of claim 24, wherein the angle shifter uses at least one of reflection, refraction and scattering of light.

29. The projection display device of claim 24, wherein the incident angle of the image is changed within a distance of pixel gaps between first pixels and second pixels adjacent to the first pixels, the first pixels being pixels used for the image projected on the screen.

30. The projection display device of claim 24, wherein the incident angle of the image is periodically changed in horizontal and/or vertical directions with respect to the screen.

31. The projection display device of claim 24, wherein the angle shifter further comprises:
 a dummy holder connected to the angle shifting plate, for driving the angle shifting plate;
 a rotation reference boss provided at end portions of upper and lower surfaces of the dummy holder;
 a reference holder having a rotation reference hole into which the rotation reference boss is inserted; and
 an elliptical insertion hole formed at one side of the dummy holder.

32. The projection display device of claim 31, wherein the angle shifting plate is made of a light transmitting material.

33. The projection display device of claim 31, wherein the angle shifting plate repetitively rotates between a position vertical to a traveling direction of light and a position tilted by a predetermined angle at which the pixel is visually movable by a gap between the pixels.

34. The projection display device of claim 31, wherein the eccentric cam includes a motor having a motor boss decentered from a rotational center of the motor so as to drive the angle shifting plate, the motor boss being inserted in the elliptical insertion hole.

35. The projection display device of claim 34, wherein the decentered degree of the motor boss is proportional to a shifted distance of the angle shifting plate.

36. A projection display method comprising the steps of:
 forming an image by using a light emitted from a light source and an inputted image signal;
 periodically changing a traveling direction of the image within a pixel gap of an imaging element during a predetermined time duration by an angle shifter which includes an angle shifting plate for periodically changing an incident angle of the image projected through repetitive rotational motions and an eccentric cam for driving the repetitive rotational motions of the angle shifting plate; and
 enlarging and projecting the image whose traveling direction is periodically changed on a screen.

37. The projection display method of claim 36, wherein the predetermined time duration is one frame.

38. The projection display method of claim 36, wherein the traveling direction of the image is periodically changed by at least one of reflection, refraction and scattering of light.

39. The projection display method of claim 36, wherein the traveling direction of the image is periodically changed in at least one direction among up, down, right and left directions.

* * * * *